United States Patent
Erlingsson et al.

(10) Patent No.: US 7,664,927 B2
(45) Date of Patent: Feb. 16, 2010

(54) HASH TABLES

(75) Inventors: Ulfar Erlingsson, San Francisco, CA (US); Mark Steven Manasse, San Francisco, CA (US); Frank D. McSherry, San Francisco, CA (US); Abraham D. Flaxman, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 11/393,014

(22) Filed: Mar. 29, 2006

(65) Prior Publication Data

US 2007/0234005 A1   Oct. 4, 2007

(51) Int. Cl.
G06F 12/00 (2006.01)

(52) U.S. Cl. ...................... 711/216; 711/165
(58) Field of Classification Search ............... 711/216, 711/165
See application file for complete search history.

(56) References Cited

U.S. PATENT DOCUMENTS

| | | | | |
|---|---|---|---|---|
| 4,290,105 A | * | 9/1981 | Cichelli et al. | 707/5 |
| 4,996,663 A | * | 2/1991 | Nemes | 707/200 |
| 5,530,958 A | * | 6/1996 | Agarwal et al. | 711/3 |
| 6,553,420 B1 | | 4/2003 | Karger et al. | 709/226 |
| 6,717,946 B1 | | 4/2004 | Hariguchi et al. | 370/392 |
| 6,804,767 B1 | * | 10/2004 | Melvin | 711/216 |

OTHER PUBLICATIONS

Rushton, Andy. hash—A Chained Hash Table Container. STLplus Library [online], Sep. 2, 2004 [retrieved on Feb. 28, 2008]. Retrieved from the Internet:< URL:http//stlplus.sourceforge.net/stlplus/docs/hash.html>.*
Zaiane, Osmar. Dynamic Hashing. [online], Jul. 13, 1998 [retrieved on Mar. 11, 2008]. Retrieved from the Internet:< URL:http://www.cs.sfu.ca/CC/354/zaiane/material/notes/Chapter11/node20.html>.*
Tindale, Ben. Hash Tables in Java. Linux Gazette [online], Sep. 2000 [retrieved on Apr. 24, 2008]. Retrieved from the Internet:< URL:http//linuxgazette.net/issue57/tindale.html>.*
Bandyopadhyay et al., Raj. Tradeoff between coverage of a Markov prefetcher and memory bandwidth usage. [online], Spring 2005 [retrieved on Apr. 24, 2008]. Retrieved from the Internet:<URL:http//www.owlnet.rice.edu/~elec525/projects/markov_report.pdf>.*
Fotakis, D. et al., "Space Efficient Hash Tables with Worst Case Constant Access Time", *Proceedings of the 20th Annual Symposium on Theoretical Aspects of Computer Science(STACS 2003), Lecture Notes in Computer Science*, 19 pages.
Panigrahy, R., "Efficient Hashing with Lookups in Two Memory Accesses", Sep. 23, 2005, 1-12.

* cited by examiner

*Primary Examiner*—Reginald G Bragdon
*Assistant Examiner*—Larry T Mackall
(74) *Attorney, Agent, or Firm*—Woodcock Washburn LLP

(57) ABSTRACT

Hash tables comprising load factors of up to and above 97% are disclosed. The hash tables may be associated with three or more hash functions, each hash function being applied to a key to identify a location in a hash table. The load factor of a hash table may be increased, obviating any need to increase the size of the hash table to accommodate more insertions. Such increase in load factor may be accomplished by a combination of increasing the number of cells per bucket in a hash table and increasing the number of hash functions associated with the hash table.

18 Claims, 9 Drawing Sheets

700

|                | 1 cell | 2 cells | 4 cells | 8 cells |
|----------------|--------|---------|---------|---------|
| 4 hash function | 97%    | 99%     | 99.9%   | >99.9%  |
| 3 hash function | 91%    | 97%     | 98%     | 99.9%   |
| 2 hash function | 49%    | 86%     | 93%     | 96%     |
| 1 hash function | 0.06%  | 0.6%    | 3%      | 12%     |

FIG. 7

HASH TABLES

BACKGROUND

A hash table may be represented by an array of n elements. Each element e may have one or more locations $L_e$ at which it might be found in the table. In typical hashing, $L_e$ may consist of a single location. To lookup an element, the location in a hash table $L_e$ may be checked to see if the element e is there. If all the locations $L_e$ are of some relatively small maximum size, this may be manifestly a constant-time operation.

An insertion operation may be slightly more complex than a lookup operation. One way to perform an insertion may be to remove data from one of the locations $L_e$ and insert it someplace else until an open bucket (i.e., a bucket into which the data may fit) is found. Another way may be to perform a search to find a shortest sequence of such removals and insertions that result in an empty space in the original locations Le.

If each $L_e$ has exactly two locations, a hashing algorithm may work but may lack good space efficiency. That is, once the hash table is about half full, insertions may fail. An alternative to providing two locations may be to set $L_e$ at four. That is, establish that $L_e$ is four independent locations within a hash table. This may increase the load factor—that is, increase the number of buckets of the hash table that are filled as compared to the total number of buckets in the hash table—to approximately 97%. To provide for four independent locations, the number of different hash functions applied to a key may be four.

An alternative to establishing that $L_e$ is four independent locations may be to establish $L_e$ at four dependent locations. Dependent locations can be created by applying any deterministic function to an original location. One way of creating dependent locations is to divide each bucket in the array into two portions, referred to herein as cells. Thus, bucket x may be divided into cells $2x$ and $2x+1$. In this way, the number of hash computations may be two instead of four while establishing $L_e$ at 4. This approach of creating dependent locations in a contiguous successive sequence may take advantage of properties of a memory system that make it more efficient to look at consecutive memory locations. Such hash tables may include a load factor of at least 87%.

SUMMARY

Hash tables comprising very high load factors (up to and above 97%) are disclosed. The hash tables may be associated with two or more hash functions, each hash function being applied to a key to identify a location in a hash table. Alternatively or additionally, each location in a table may be a bucket or may be a cell of a bucket. That is, each bucket of a hash table may be subdivided into two or more cells so that a value associated with a key may be inserted into any cell of a bucket that can accommodate the value.

Buckets may be subdivided into more cells (e.g., 4, 8, etc), which may increase the load factor of the hash table, thus aiding in maximal utilization of memory. Setting the buckets to contain more cells may not increase or greatly increase pressure on a memory hierarchy that may be stressed by a given table size. In particular, buckets may be coalesced to reduce their number, but increase the cells per bucket when the amount of work per insertion of values becomes higher than desired.

After a hash table is generated and associated with one or more hash functions, as the amount of work per insertion becomes higher than desired, additional hash functions may be associated with the table "on the fly." Alternatively or additionally, as the amount of work per insertion becomes higher than desired, more buckets may be coalesced or additional cells may otherwise be added to the table (e.g., by increasing memory allocated to the table) on the fly. Thus, the load factor of a hash table may be increased, obviating the need to increase the size of the hash table to accommodate more insertions.

BRIEF DESCRIPTION OF THE DRAWINGS

The foregoing summary and the following detailed description are better understood when read in conjunction with the appended drawings. Embodiments are shown in the drawings, however, it is understood that the claims are not limited to the specific methods and instrumentalities depicted therein. In the drawings:

FIG. 7 is a graphical depiction of example hash table load factors that may be achieved in alternative embodiments;

DETAILED DESCRIPTION OF ILLUSTRATIVE EMBODIMENTS

As used throughout this application, the terms "location," "bin," "bucket," or "slot" each means a location within a hash table associated with a key. A location, bin, bucket, or slot may or may not contain one or more elements, records, values, or data associated with a key. The term "cell" means any subdivision of a location, bin, bucket, or slot. Thus a location, bin, bucket, or slot may be divided into two or more cells, and each cell may contain one or more values, records, elements, or data, or otherwise be associated with a key. The terms "data," "element," "record," "value," or "key" each means any data or information stored in a hash table. Such data or information typically is associated with a key. The term "key" means data or information to which a hash function may be applied. A hash function may be applied to a key to identify a location, bucket, bin, slot, or cell in a hash table associated with the key. The term "hash table" means any structure, array, set, cache, or other memory device that associates keys with values or keys with respective table locations. Hash tables, for example, may be used for symbol tables, caches, or sets. The term "hash function" means a function that uses a key as an input and returns data associated with or identifying a location, bucket, bin, slot, or cell of a hash table.

Figure 1:
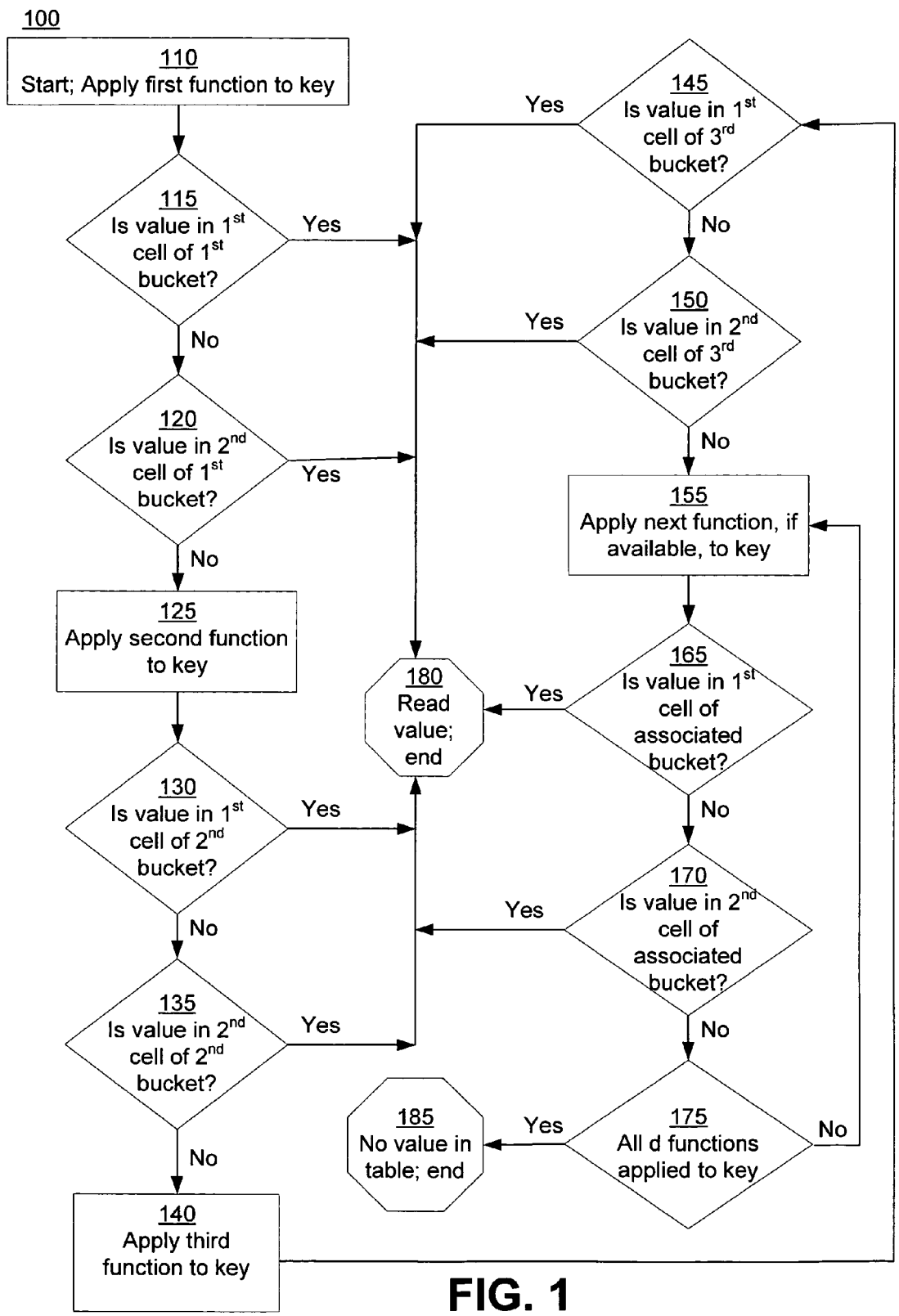
FIG. 1 is a flow diagram of an example method for performing lookups in a hash table comprised of buckets having two cells each, where each key may be associated with one or more of at least three independent buckets.

FIG. 1 is a flow diagram of an example method 100 for performing lookups in a hash table comprised of buckets having two cells each, where each key may be associated with one or more of at least three independent buckets. That is, the hash table associated with the method 100 generally may include at least three independent buckets into which a value associated with a key may be stored.

Values associated with keys or keys themselves may be located in more than one location. In this way, values or keys in a hash table may be moved while a copy is left in its original location until relocation, described herein, is accomplished. Thus, each key or value associated with a key in a table may appear simultaneously at one or more of its possible locations, as induced by applying available hash functions to the key, and by the cell choices available in each bucket.

The method 100 may commence at step 110 by applying a first hash function to a key, resulting in identification or indexing of a first bucket. At step 115, a first cell of the bucket may be searched, and if the value or record is found, then the value may be read at step 180. If the first cell does not contain a value associated with the key, then at step 120, a second cell of the bucket is searched. If the second cell contains such a value, then the value may be read at step 180.

If the second cell does not contain such a value, then at step 125, a second hash function may be applied to the key. The result may identify a second bucket that may contain one or more values associated with the key. The second bucket, as well as any other bucket identified after applying any hash function to the key, may be located anywhere in the hash table. At step 130, a first cell of the second bucket may be searched for a value associated with the key. If such a value is found, then the value may be read at step 180. If such a value is not found in a first cell of the second bucket, then a second cell of the bucket may be searched at step 135. If a value associated with the key is found, then it may be read at step 180. If such a value is not found then, at step 140, a third hash function may be applied to the key.

After applying the third hash function to the key, a third bucket may be identified. The third bucket may contain values or data associated with the key. At steps 145 or 150, respective first and second cells of the third bucket may be searched. If a value associated with the key is found, then it may be read at step 180. If such a value is not found, then at step 155, another hash function may be applied to the key to identify another bucket that may be associated with the key. A first cell of the next bucket may be searched for a value associated with the key at step 165. If the value is found, then it may be read at step 180. If the value is not found, then a second cell of the next bucket may be searched at step 170, and if such a value is found, then it may be read at step 180. If the value is not found, then a determination may be made as to whether there are any more buckets in the hash table associated with the key. Such a determination may be accomplished by evaluating, at step 175, whether all hash functions that may have been applied to the key to associate a bucket with the key have been applied to the key. If all d functions associated with the key have not been applied, then steps 155-175 may be repeated for each additional hash function until all d hash functions have been applied to the key. If, after applying all d hash functions, no buckets associated with the key contain one or more values associated with the key, then no such value may exist and the method may end at step 185.

Figure 2:
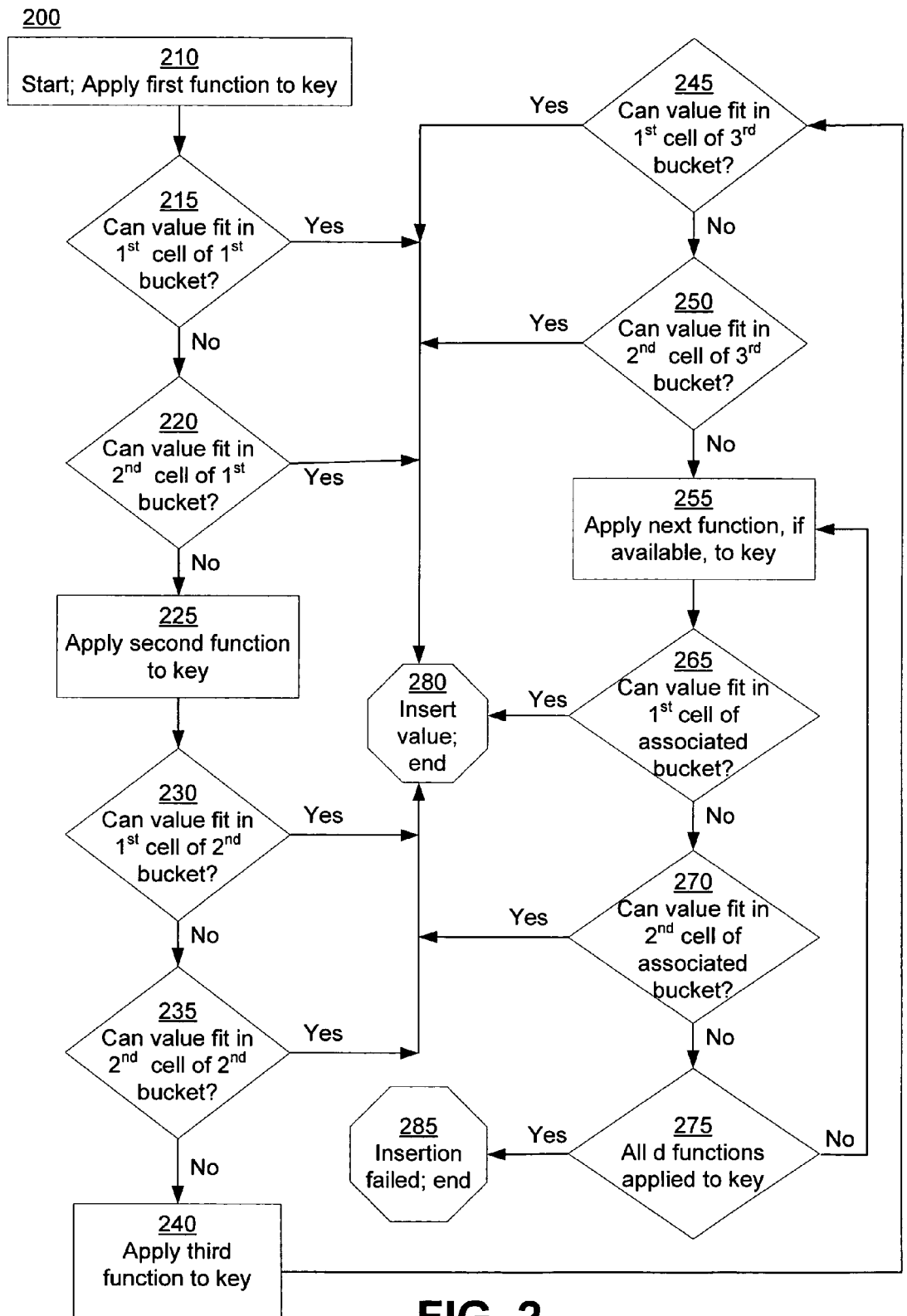
FIG. 2 is a flow diagram of an example method for performing insertions in a hash table comprised of buckets having two cells each, where each key may be associated with one or more of at least three independent buckets.

FIG. 2 is a flow diagram of an example method 200 for performing insertions in a hash table comprised of buckets having two cells each, where each key may be associated with one or more of at least three independent buckets. That is, the hash table associated with the method 200 generally may include at least three buckets into which a value associated with a key may be stored.

The method 200 may start at step 210 by applying a first hash function to a key to determine a bucket into which a value associated with the key may be stored. After a first bucket is determined from step 210, at step 215 a first cell of the first bucket is evaluated to determine whether the cell can accommodate the value. Such a determination may depend on the size and structure of cells and buckets in a hash table as well as a size of the value. For example, the hash table may be designed such that each cell may contain only one value and, therefore, if a cell contains a value, then a second value may not be inserted into the cell. In an alternative hash table, cells may be designed to hold more than one value and up to some maximum value. Thus at step 215, a determination may be made whether the value associated with the key will "fit" into the cell.

It should be understood that, depending on the design of the hash table, values in cells may be moved to other cells to accommodate a new value. This is described further herein. For purposes of clarity of explanation, the method 200 assumes that values will not be placed in cells if the values cannot fit and that items already stored in the cells are not removed to accommodate new values.

If, at step 215, it is determined that the value can fit into a first cell of the first bucket, then the value may be inserted into the cell at step 280. If the value cannot fit into a first cell of the first bucket, then at step 220, a second cell is evaluated to determine whether the value can fit into the second cell. If the value can fit, then at step 280, the value may be inserted. If the value cannot fit into the second cell, then a second function may be applied to the key at step 225 to identify a second bucket in which one or more values associated with the key may be stored.

If at step 230, a determination is made that such a value may fit into a first cell of the second bucket, then the value may be so inserted at step 280. If the value may not fit into a first cell, then at step 235, a determination is made regarding whether the value may fit in a second cell of the second bucket. If so, then the value may be inserted at step 280. If not, then a third hash function may be applied to the key at step 240 to identify a third bucket that may be associated with the key. At steps 245 and 250, a determination is made whether the value may fit into, respectively, a first or a second cell of the third bucket. If either of these determinations results in an insertion at step 280, then the method 200 is complete.

If the value may not fit into either a first or a second cell of the third bucket, then a next hash function, if another hash function is available, is applied to the key at step 255. Such an application will identify another bucket that may be associated with the key. A first cell of this bucket may be evaluated to see if the value may fit at step 265. If so, then the value may be inserted at step 280. If not, then at step 270, a second cell of the bucket is evaluated. If the value may fit, then it may be inserted at step 280.

If not, then a determination may be made as to whether all hash functions that may be applied to the key have been applied to the key. If all hash functions associated with the key have not been applied, then steps 255-275 may be repeated for each additional hash function until a cell that may accommodate the value may be found. This process is repeated for all hash functions associated with the table. If, after applying all hash functions, no cells in buckets resulting from the application of the hash function to the key may accommodate the value, then the insertion may fail and the method 200 may end at step 285.

Generally, if insertion operations are consistently performed in a certain order, that is, if a first hash function is always applied to the key first, a second hash function is applied second, etc., then a table with keys {k1, ..., kN} may have all buckets {h1(k1), ..., h1(kN)} occupied. This may help ensure that, for example, when a next hash function is applied to a key to perform a lookup operation, if an empty location is found, then an assumption may be made that the table does not contain a value associated with the key. Thus, a hash table developed or filled through a constant order of execution of hash functions may allow accurate inferences.

Additionally, an incrementally deeper depth-first-search may be used to implement a breadth-first-search. This may require maintenance of only a small amount of state, may be easy to program, and may include good cache behavior. For example, if a table is associated with three hash functions, then for any insertion operation, there may be three values that may be moved to other locations. Each of these three values may be moved to two other locations. Thus, a tree may be formed. To accelerate the insertion, a depth-first-search may be performed to, for example, level one of the tree. At level one, a breadth-first-search may be performed. If an empty location is not found, then a new depth-first-search may be performed to level two, which is then the subject of a breadth-first-search. This may be performed until an empty location has been found and the insertion operation can be completed.

Figure 3:
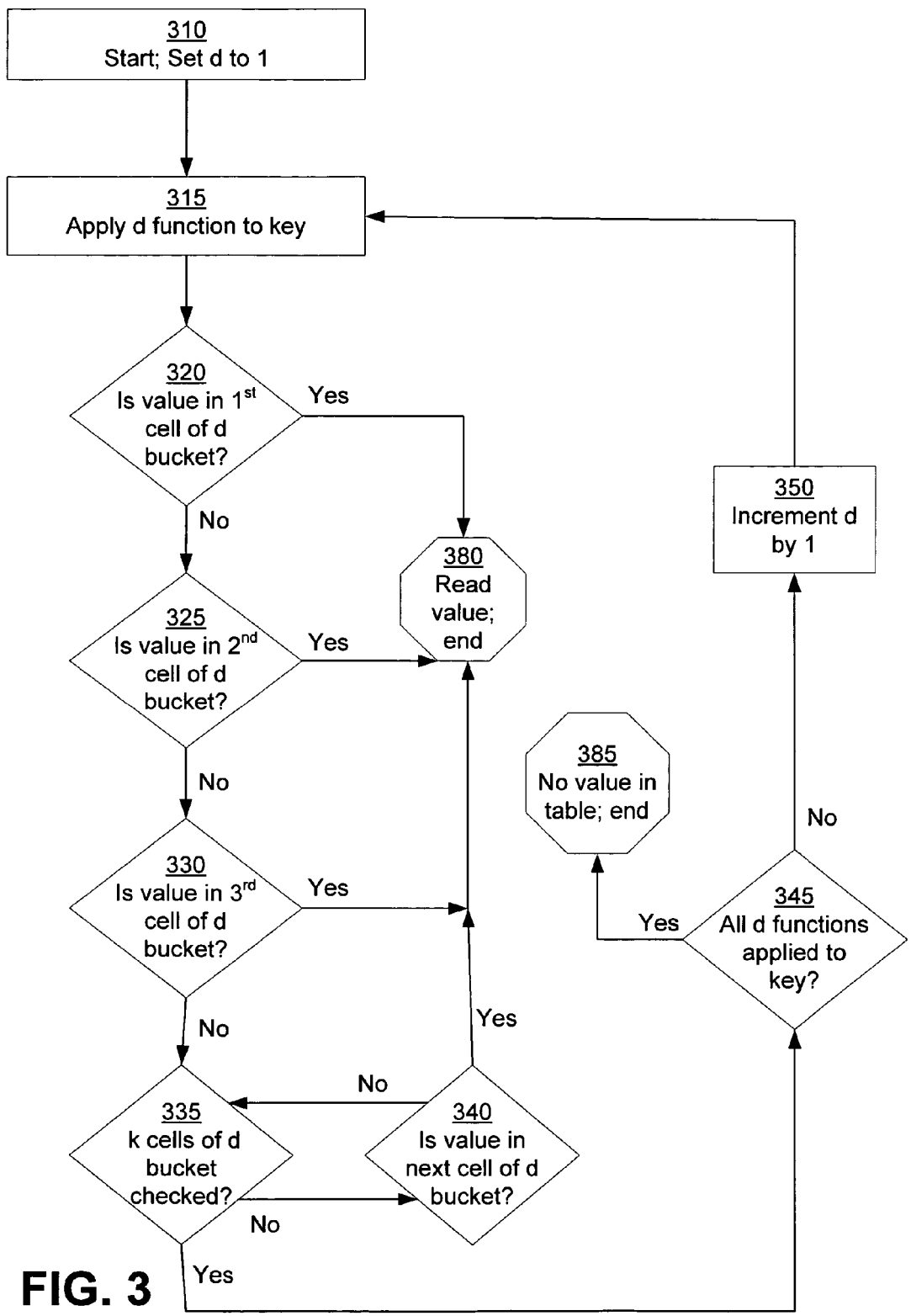
FIG. 3 is a flow diagram of an example method for performing lookups in a hash table comprised of buckets having more than two cells each, where each key may be associated with one or more of at two least three hash functions.

FIG. 3 is a flow diagram of an example method 300 for performing lookups in a hash table comprised of buckets having more than two cells each, where each key may be associated with one or more of at two least three hash functions. That is, the hash table associated with the method 300 generally may include at least three buckets into which a value associated with a key may be stored, where the buckets contain at least three cells each. Of course, it may be that the number of cells in a bucket is a factor of two. Note that a valid table with L cells-per-bucket is also valid with two times L cells-per-bucket at half the number of buckets. Such coalescing of buckets may be accomplished by, for example, stripping a low-order bit from an index hash value.

The method 300 may start at step 310, where a variable d, referencing a hash function, is set to 1. That is, the method 300 starts with the first hash function. At step 315, the first hash function is applied to a key to locate a first bucket of a hash table associated with the key. A search of the first bucket for a record associated with the key may then commence. It should be understood that application of a hash function to a key may, in addition to identifying a bucket to be searched, also identify a location within the bucket to be searched. For example, application of the hash function may identify a bucket and may also identify that the search of the bucket should commence two-thirds of the way down the bucket or should commence at a third level of a tree structure representing information in the bucket, etc.

At step 320, a first cell of the first bucket is examined to determine if it contains a value associated with the key. If such a value is in the first cell of the first bucket, then at step 380, a read is completed to read the value associated with the key. If such a value is not contained in the first cell, then at step 325, a second cell of the first bucket is evaluated to determine if it contains a value associated with the key. If the second cell does contain such a value, then the value may be read at step 380. If the second cell does not contain such a value, then a third cell may be searched to determine if it contains a value associated with the key at step 330. If it does, then a read may be performed at step 380. If it does not, then, at step 335, a determination may be made as to whether all k cells of d bucket have been searched. If the bucket contains more than three cells, then at step 340, a next cell may be searched for a value associated with the key. If a value is found, then it is read at step 380.

If no value is found, then at step 335, the bucket may again be evaluated to determine if all k cells within the bucket have been searched for a value associated with the key. If not all cells have been searched, then steps 335 and 340 may be repeated until either a value associated with the key is located within the bucket, in which case a read of the value is performed at step 380, or until all cells have been searched. If all cells have been searched, then at step 345, a determination may be made as to whether all hash functions associated with the key have been applied to the key. In one embodiment, the hash table may be associated with three hash functions, and therefore, the outcome of step 345 may be "no" until cells of at least three buckets are searched for a value associated with the key. If all hash functions have not been applied to the key, then at step 350, the value of d may be incremented by 1, and a next hash function may be applied to the key at step 315. The appropriate steps of the method 300 may be repeated until a cell of a bucket may be found that contains a value associated with the key. The steps may be continued until, at step 345, a determination is made that all hash functions have been applied to the key. In the event that the resolution of the step 345 is "yes," then, at step 385, a determination is made that the table does not contain a value associated with the key, and the method 300 may end.

Figure 4:
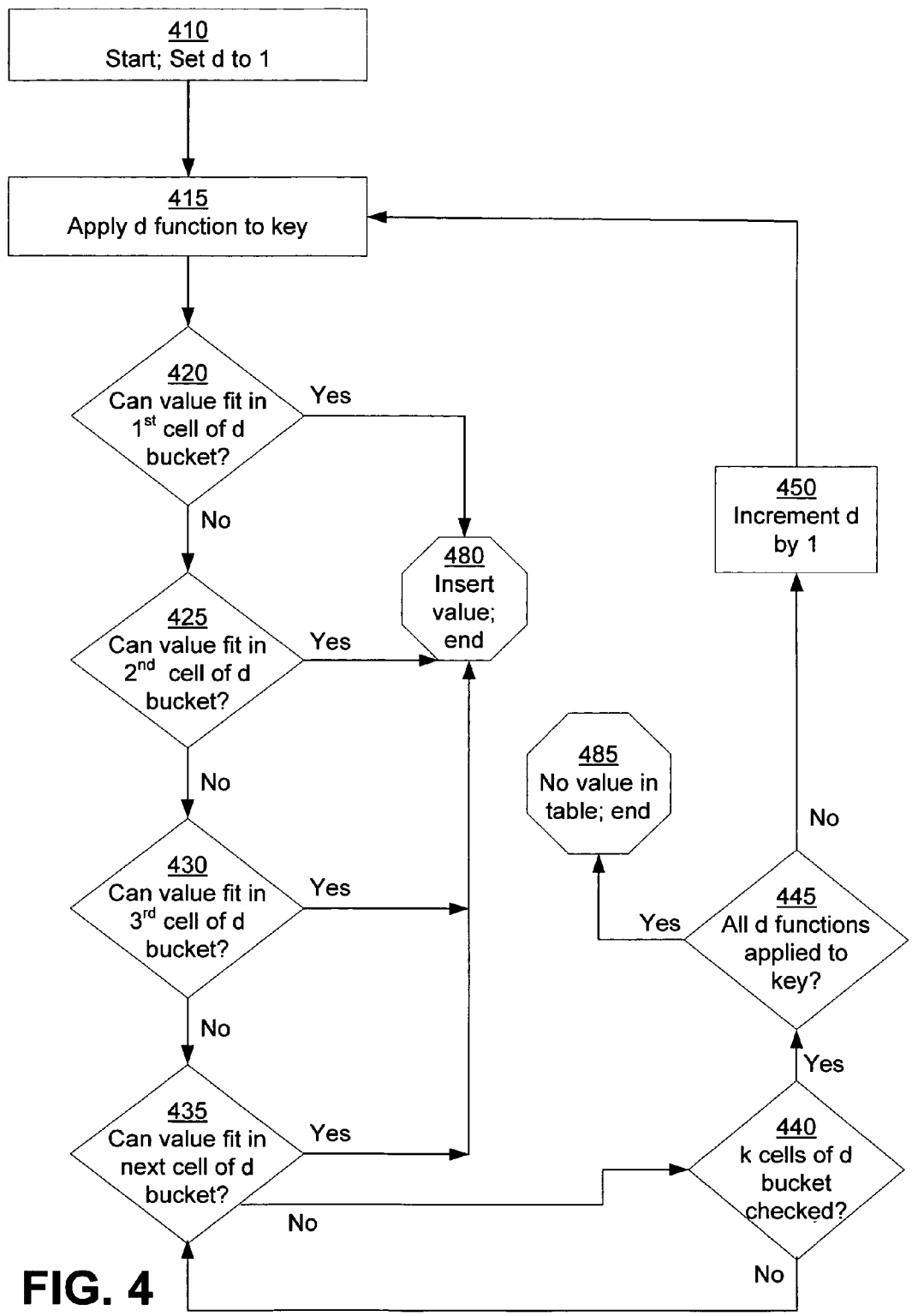
FIG. 4 is a flow diagram of an example method for performing insertions in a hash table comprised of buckets having more than two cells each, where each key may be associated with one or more of at two least three hash functions.

FIG. 4 is a flow diagram of an example method 400 for performing insertions in a hash table comprised of buckets having more than two cells each, where each key may be associated with one or more of at least three hash functions. That is, the hash table associated with the method 400 generally may include at least three buckets into which a value associated with a key may be inserted, where the buckets contain at least three cells each. It may be that the number of cells in a bucket is a factor of two. That is, a valid table with L cells-per-bucket is also valid with two times L cells-per-bucket at half the number of buckets. Such coalescing of buckets may be accomplished by, for example, stripping a low-order bit from an index hash value.

The method 400 may start at step 410, where a variable d, representing a hash function, is set to 1. That is, the method 400 starts with the first hash function. At step 415, the first hash function is applied to a key to determine a first bucket of a hash table associated with the key. At step 420, a first cell of the first bucket is examined to determine if the value can "fit" into the cell. If such a value may fit into the first cell of the first bucket, then at step 480, the value may be inserted into the cell. If such a value may not fit into a first cell, then at step 425, a second cell of the first bucket is evaluated to determine if the value may fit into the second cell. If the value may fit into the second cell, then the value may be inserted into it at step 480. If the value may not fit into the second cell, then a third cell may be searched at step 430 to determine if it may accommodate the value. If so, then it may be inserted into the third cell at step 480. If the third cell of the first bucket may not accommodate the value associated with the key, then a determination may be made as to whether the bucket contains more than three cells. If the bucket contains more than three cells, a next cell may be searched at step 435 for a value associated with the key. If a value is found, then it may be inserted at step 480.

If the next cell cannot accommodate the value, then, at step 440, the bucket may be evaluated to determine if all k cells within the bucket have been evaluated to determine if the value may be inserted. If not all cells have been searched, then steps 435 and 440 may be repeated until either a cell is determined to be able to accommodate the value, in which case an insert may be performed at step 480, or until all cells have been searched. If all cells have been searched, then at step 445, a determination may be made as to whether all d hash functions associated with the key have been applied to the key. In one embodiment, d may be at least three, and therefore, the outcome of step 445 may be "no" until cells of at least three buckets are searched for a cell that may accommodate a value associated with a key. If all d hash functions have not been applied to the key, then at step 450, the value of d may be incremented by 1, and a next hash function may be applied to the key at step 415. Appropriate steps of the method 400 may be repeated until a cell of a bucket may be found that may accommodate the value associated with the key. The steps may be continued until, at step 445, a determination is made that all d hash functions have been applied to the key. In the event that the resolution of the step 445 is "yes," then, at step 485, a determination is made that the table does not contain a cell in which the value associated with the key may be inserted, and the insertion may fail, ending the method 400.

Figure 5C:
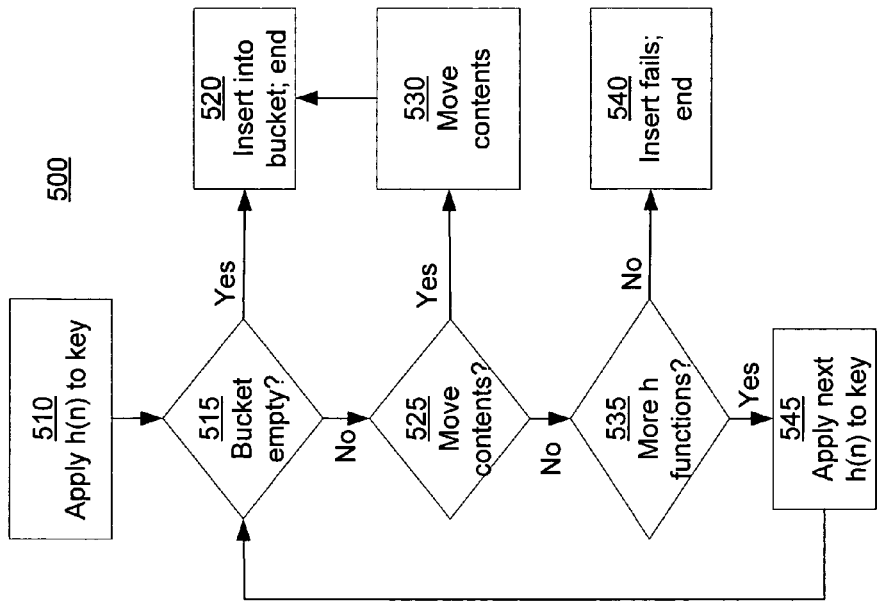
FIG. 5C is flow diagram of a method for inserting a value associated with a key into a hash table such as that shown in FIGS. 5A and 5B.
Figure 5A:
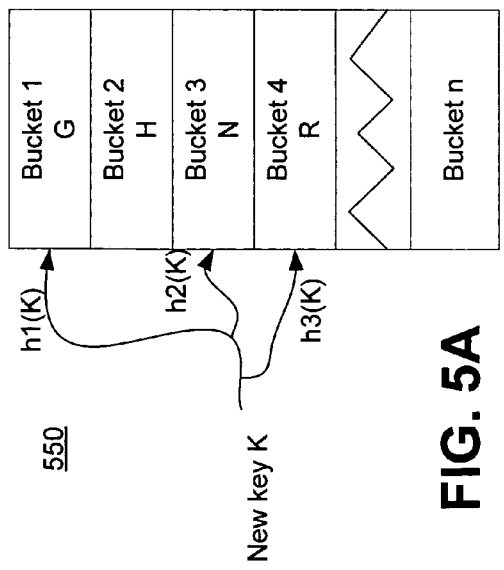
FIGS. 5A and 5B are block diagrams of an example hash table into which a value associated with a key may be inserted.
Figure 5B:
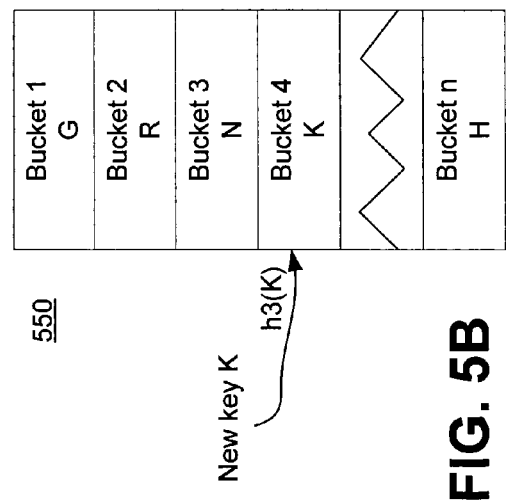

FIGS. 5A and 5B are block diagrams of an example hash table 550 into which a value associated with a key K may be inserted. FIG. 5C is flow diagram of a method 500 for inserting a value associated with a key K into a hash table such as that shown in FIGS. 5A and 5B. The example insertion methods 200, 400 determined whether a value may "fit" into a bucket or a cell, respectively, of a hash table. In making this determination, another determination may be made. If a value may not fit into a bucket or a cell, then a determination may be made as to whether the contents of the bucket or cell may be moved to elsewhere in the table so that the value may fit. The example method 500, along with the hash table 500 shown in two different stages during execution of the method 500, demonstrate one way of providing insertions by moving, or sliding, contents of buckets to provide room for an insertion.

The hash table 550 may include bucket 1, bucket 2, bucket 3, bucket 4, and more buckets up to some number of n buckets. The bucket 1 may contain a value G, the bucket 2 may contain a value H, the bucket 3 may contain a value N, the bucket 4 may contain a value R, and the n$^{th}$ bucket may be empty. The table 550 may be associated with one or more hash functions h, and the values G, H, N, and R may have been inserted into a respective bucket of the hash table after one of the hash functions h was applied to a respective key associated with the value.

With reference to FIGS. 5A and 5B, the method 500 shown in FIG. 5C may start at FIG. 510 with a first hash function h1 being applied to the key K. As shown in FIG. 5A, application of the first hash function h1 to the key K may identify bucket 1 as a location into which the value associated with the key K may be inserted. At step 515, a determination may be made as to whether the bucket 1 is empty. If the bucket 1 is empty, then the associated value may be inserted into it at step 520. As shown in the hash table 550 of FIG. 5A, the bucket 1 contains a value G, and therefore the bucket is not empty.

At step 525 a determination may be made as to whether the contents of the bucket 1, that is, the value G, may be moved to another location. That is the hash functions h may be applied to the key associated with the value G or directly to the value G to determine another location into which the value G may be moved so that the value associated with the key K may be inserted into the bucket 1. It should be recognized that this evaluation may involve evaluation of other buckets of the hash table 550.

If another bucket may accommodate G, then at step 530, the value G may be moved to a new location and the value associated with the key K may be inserted into the bucket 1. If at step 525, it is determined that the value G cannot be moved (because, for example, application of a hash table to the value G does not result in a bucket that can accommodate G), then a determination may be made at step 535 as to whether more hash functions are available to apply to the key K. If there are more hash functions, then at step 545, another hash function h2 may be applied to the key K to identify another bucket for insertion. As shown in FIG. 5A, application of the hash function h2 to the key K results in identification or the bucket 3. Again at step 515, the bucket 3 is evaluated to see if the value associated with the key K may fit into the bucket 3. Because the bucket 3 contains the value N, a determination may be made as to whether the value N may be moved to another location within the hash table 550. Assuming for purposes of this example that the value N may not be moved, a determination is made at step 535 that a hash function h3 may be applied to the key K. At step 545 the hash function h3 is applied to the key K, which results in identification of the bucket 4. An evaluation in the bucket 4 at step 515 results in a determination that the bucket contains the value R. At step 525, the value R is evaluated to determine whether it may be moved to another location in the hash table 550.

For purposes of the example method 500, we may assume that application of one of the hash functions 1-3 is applied to the value R, resulting in identification of the bucket 2. An evaluation of the bucket 2 results in a determination that the value H is contained in the bucket 2. At this point, a determination may be made that the value R may not be moved to the bucket 2 and a second hash function may be applied to the value R to determine if there is a second bucket into which the value R may be moved. Alternatively, the value H in the bucket 2 may be evaluated to determine if it may be moved so that the value R may be stored in it. Assume for purposes of the example method 500 that application of the hash function 3 on the value H results in identification of the bucket n.

As shown in FIG. 5A, the bucket n does not contain any values. Therefore, as shown in FIG. 5B, the value H may be moved from the bucket 2 to the bucket n, the value R may be moved from the bucket 4 to the bucket 2, and the value associated with the key K may be inserted into the bucket 4. In this way, values in buckets may be moved around a hash table such as the hash table 550 in a cascading sequence until the insertion is completed. This type of search for an empty location induces a search tree over locations in the table, with a path from the root of that tree to an empty slot defining the cascading sequence of relocations. Upon insertion at step 520, the method 500 may end. If no bucket in the hash table 550 is able to accommodate the insertion of the value associated with the key K, then the insertion fails at step 540.

Figure 6B:
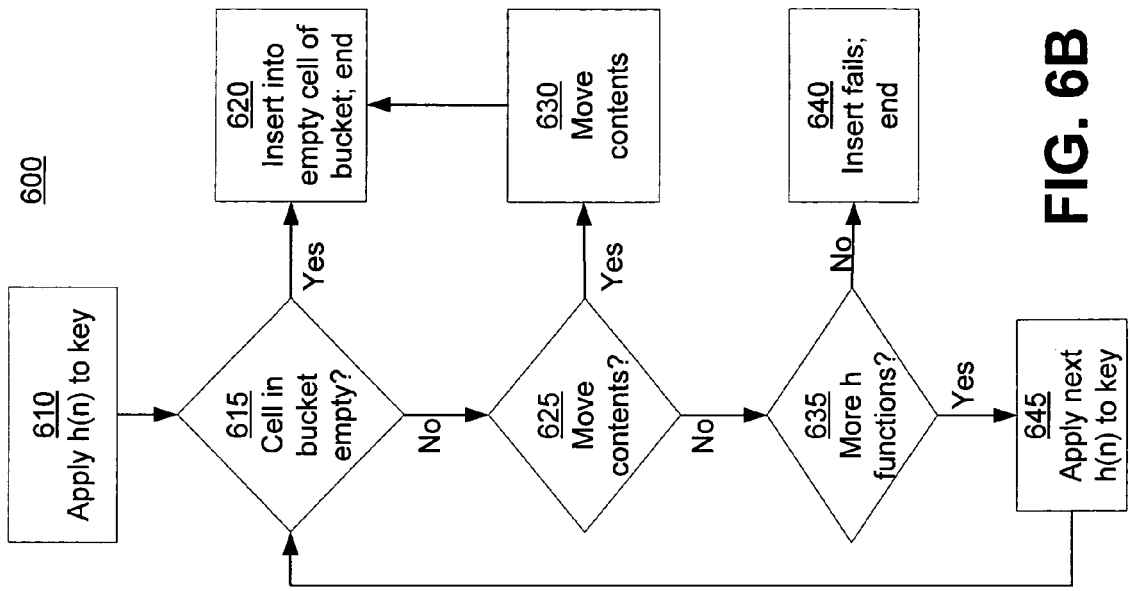
FIG. 6B is flow diagram of an example method for inserting a value associated with a key into a hash table such as that shown in FIG. 6A.
Figure 6A:
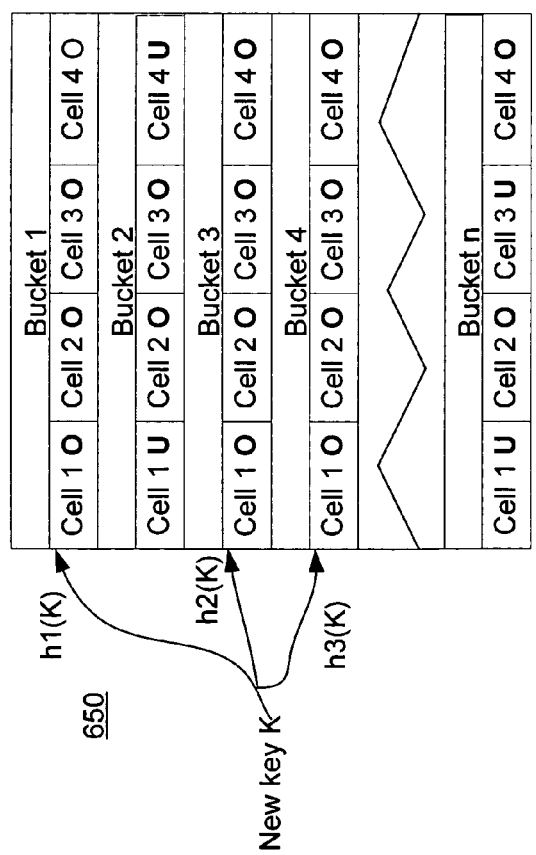
FIG. 6A is a block diagram of an example hash table into which a value associated with a key may be inserted.

FIG. 6A is a block diagram of an example hash table 650 into which a value associated with a key K may be inserted. FIG. 6B is flow diagram of an example method 600 for inserting a value associated with a key K into a hash table such as that shown in FIG. 6A. The example insertion method 500 described with regard to FIG. 5A determined whether a value may "fit" into a bucket of a hash table by sliding other values into other buckets of the table 550. The example method 600 may determine whether a value may fit into a cell of a bucket by sliding other values into cells of other buckets of the table 650.

The hash table 650 may include bucket 1, buckets 1-n. Each bucket may include four cells, cells 1-4. The cells may be either occupied, denoted in FIG. 6A by the letter "O," or unoccupied, denoted by the letter "U." The table 650 may be associated with one or more hash functions h, and values of the occupied cells may have been inserted into a respective cell after one of the hash functions h was applied to a respective key associated with the value.

With reference to FIG. 6A, the method 600 shown in FIG. 6B may start at step 610 with a first hash function h1 being applied to the key K. As shown in FIG. 6A, application of the first hash function h1 to the key K may identify bucket 1 as a location into which the value associated with the key K may be inserted. At step 615, a determination may be made as to whether any of the cells 1-4 of the bucket 1 is empty. If a cell is empty, then the associated value may be inserted into it. As shown in the hash table 650 of FIG. 6A, each of the cells 1-4 is occupied, and therefore the cell is not empty.

At step 625, a determination may be made as to whether the contents of any of the cells of the bucket 1 may be moved to another location. That is the hash functions h may be applied to the key associated with a value of any of the cells to determine another location into which the value may be moved so that the value associated with the key K may be inserted into the cell. It should be recognized that this evaluation may involve evaluation of other buckets and other cells of the hash table 650.

It should be recognized that, if a bucket contains more than one cell, then a cell within the same bucket may be full while another cell in the bucket may be empty. Hash table functionality may include that a value within one cell of such a bucket may not be moved to another cell within the same bucket. That is, a new value may be inserted into an empty cell rather than moving a value from cell to cell within the same bucket. In this way, a search may be expedited by trimming the search tree induced by a depth-first-search to look at locations in different buckets.

If another bucket may accommodate a value of a cell of bucket 1, then at step 630, the value may be moved to a new location and the value associated with the key K may be inserted into the now-empty cell of the bucket 1. If at step 625, it is determined that a value cannot be moved (because, for example, application of a hash table to the value does not result in a bucket that contains a cell that can accommodate the value), then a determination may be made at step 635 as to whether more hash functions are available to apply to the key K. If there are more hash functions, then at step 645, another hash function h2 may be applied to the key K to identify another bucket for insertion.

As shown in FIG. 6A, application of the hash function h2 to the key K results in identification of the bucket 3. Again at step 615, the bucket 3 is evaluated to see if the value associated with the key K may fit into any of the cells 1-4 of the bucket 3. Because the cells 1-4 of the bucket 3 are occupied by respective values, a determination may be made as to whether any of the values may be moved to another location within the hash table 650. Assuming for purposes of this example that no value may be moved, a determination is made at step 635 that a hash function h3 may be applied to the key K.

At step 645 the hash function h3 is applied to the key K, which results in identification of the bucket 4. An evaluation in the cells 1-4 of the bucket 4 at step 615 may result in a determination that all cells 1-4 are occupied. At step 625, one of the hash functions h1-h3 may be applied to, for example, the value in cell 1 of the bucket 3. This may result in an identification of the bucket 2 as a location to which the contents of cell 1 in bucket 3 may be moved. An evaluation of the cells 1-4 of the bucket 2 may result in a determination that cell 4 is unoccupied. Therefore the contents of the cell 1 of the bucket 3 may be moved to cell 4 of the bucket 2 at step 630 of the method 600. At step 620, the value associated with the key K may then be inserted into the cell 1 of the bucket 3.

It should be recognized that, if an agent wants to insert into the table, it may be required to wait until any reading agents complete their read operation. Reader/writer locks for synchronization may be used for locking sub-regions of the hash table at a reasonable granularity (e.g., a page size). For example, if there is a well-established order for reading, or if there is a mechanism for copying a value before moving it, then it may be necessary to acquire a writer lock only where the values are moved from or moved to during the cascading relocations phase of insertion, but not during the search-tree phase. Thus agents can concurrently continue read operations in one local area of the table while an insertion is completed in another local area of the table.

A problem associated with hash table insertion operations may be the amount of moving and searching involved in finding a bucket or cell with space to "fit" a value or key. For example and as described herein, an insertion operation may create a cascading effect as values are moved out of cells and inserted into other cells. A problem associated with hash table look-up operations may be the amount of work necessary, for example, to evaluate each node of a tree to find the desired value to be moved. Alternative embodiments, examples of which are described herein, thus include methods of performing insertions and look-ups more efficiently.

For example, for values that are located in a first cell or a second cell in a bucket a preference may be established that such values may not be moved. That is, a preference may be established that, if an item is in a first cell, for example, the value may be left in place even though it could be moved to accommodate an insertion. In this way, a weight may be established to provide that values that are read more often than other values are placed in a first cell or in a first or a second cell, which may help reduce the work to perform a read of the values.

Additionally, there may also be a bias to keep values in one memory (such as that of one machine) if a hash table is located across more than one memory with non-uniform access costs (e.g., on more than one computer). That is, while it may be inexpensive to move values within the same computer, it may be more expensive, in terms of work, for example, to move values across computers. Look-up operations may thus be similarly biased.

Another preference may be established in alternative embodiments. If a key or a value is biased toward certain values, (e.g., if it is Zipfian), then a preference may be established that such keys or values are inserted using a certain hash function, such as a first hash function associated with a table. Moreover, a preference may be established that such keys or values may not be moved when other insertions are made. In this way, the most popular contents of a hash table may be treated as "cheaply" as possible in that successful lookups of such popular items will only need to evaluate a single hash function. Moreover, a determination of the values that may be the most popular may be made by a first pass (e.g., using a counting Bloom filter), then insert during a second pass.

If there is a suspicion that an input is Zipfian, but it is not known for sure, then a bring-to-front scheme may be used during lookups so that popular objects are likely to be at their first hash function index.

Other biasing techniques may be used to more efficiently find "empty" cells for insertion operations. For example, a search for a cell may be biased toward moving values such that the cost for searching for an empty location may be minimized. When cells of a bucket are filled, a value of one of the cells may be moved so that a new value may be inserted into the cell. A technique for choosing the value to be moved most efficiently may include adding an identifier signifying the relative ease of moving the value. For example, the identifier may indicate how many moves may be necessary to complete the current insertion operation. Such an identifier may be discovered as other insertion operations are completed. An alternative way of storing these identifiers may be enabled if some bits of the values in the hash table are known to always be zero or one; then the setting of those bits may encode identifiers within the values stored in the hash table, and that information may be appropriately removed on the values when the hash table is read.

For example, during an insertion operation, an empty cell within a bucket may be noted. Then values in cells further up the tree from the empty cell that may potentially be moved into the empty cell are identified, and an identifier indicating the empty cell may be included with the values. Additionally, when values are deleted from cells, a similar process may be completed for values further up the tree.

If adding an identifier to values in cells is not desirable because, for example, the identifier consumes too many bits, then in alternative embodiments, the organization of the values within a bucket may indicate which value may be the most efficiently moved. For example, a value that is identified as being the most likely to be moved to a new cell through the fewest iterations may be placed in a first cell of a bucket. Also for example, the value least likely to be moved in the fewest iterations may be placed in the last cell of the bucket. In this way, an identifier need not be added to the value and the location of the value within the bucket may signify an efficiency associated with moving the value. Of course, other methods of minimizing the size of identifiers may be implemented, such as having the identifiers only encode the log of the estimated cost, not the cost itself or changing a bit that is known, for example, to be 0 to a 1 if the value may be the most efficiently moved.

In a further alternative embodiment, a search for an empty cell or a cell into which a value may fit may include searching for values of relatively low utility. For example values may be values that have not been the subject of a look-up operation over a predetermined amount of time or values that are relatively inexpensive to recompute. Values of higher value may be those associated with higher computation costs or those that are more frequently the subject of a look-up operation. When a value of relatively low utility is located, the value may be deleted from the tree or may be moved to a different location. Thus, values of relatively higher utility may remain in place while a preference for deleting or moving values of lower utility is used to efficiently find or make space in a table for an insertion.

Additionally, there may be a few values that may not "fit" within a particular hash table, or for whom it is prohibitively expensive to search for a cascading sequence to an empty cell. If such values may be accessed frequently, for example, or otherwise are associated with some importance, then the values may be inserted into the hash table, and a new, specially-crafted hash function may be added to guarantee that insertion will succeed.

A hash function may be used to establish an exception list. That is, the hash function may be a simple function, e.g., effectively encoding an exception list, that, while it may not ensure balanced table loading, can be used to quickly identify the value's location. An example of an exception list for a single value would be a hash function that maps that single value to a bucket known to contain an empty cell, and all other values to the first bucket. This mapping may be updated to add more such values and more such hash functions to identify locations.

FIG. 7 is a graphical depiction 700 of example hash table load factors that may be achieved in alternative embodiments. The load factor of a hash table may be the maximum achievable number of occupied cells or buckets in a hash table as a percentage of the total available cells or buckets, respectively, in the hash table. As noted in the example methods described herein, insertions into a hash table may fail if a location for a value is not found. In alternative embodiments, with a combination of coalescing buckets of a hash table into two or more cells and introducing multiple hash functions such as, for example, three or four, increasingly large load factors may be achieved. That is, more and more values may be maintained in a hash table of a given, fixed memory size.

FIG. 7 depicts example load factors for hash tables that may be achievable in, for example, a hash table with 64K cells and a fixed amount of "work" (e.g., searching for an empty cell; moving existing occupants of cells to other cells, etc.) per insertion operation. Thus, for example, a hash table may be associated with three hash functions, resulting in three potential buckets into which a value associated with a key or into which a key may be inserted. For such a hash table, if each bucket is subdivided into 2 cells, load factors of approximately 97% may be achieved. If each bucket is divided into 4 cells instead of two cells, then load factors of 98% may be achieved. At 8 cells per bucket in a hash table associated with three hash functions, load factors of 99.9% may be achieved.

If, instead of three functions, a hash table is associated with four hash functions, then if each bucket is divided into two cells, load factors of 99% may be achievable. If a four-hash-function table includes buckets each comprising four cells, then load factors of 99.9% may be achievable. If, also for example, each bucket is divided into eight cells in a hash table associated with four hash functions, then load factors of greater than 99.9% may be achievable.

As shown in FIG. 7, choosing 8 cells per bucket with a table associated with two hash functions may be almost as space-efficient as choosing a one-cell-per-bucket table associated with four hash functions or a two-cell-per-bucket table associated with three hash functions. If values are represented in eight bytes, this may require a line size of 64 bytes, which may match a Pentium 4 L1 cache line, allowing for efficient use of the memory hierarchy.

As a table reaches its maximum fill capacity or as the work-per-insert increases to an undesirable level, the ratio of cells-per-bucket may be increased or additional hash functions may be associated with the table and be applied to keys. By adding a hash function, the load factor of the table may be increased, as shown in FIG. 7.

Of course, in choosing between increasing a number of hash functions associated with a hash table or increasing a number of cells per bucket, those skilled in the art may choose the latter. That is, setting the buckets to contain more cells may be preferable to achieve a higher load factor because this may not increase or greatly increase pressure on a memory hierarchy that may be stressed by a given table size. For tables that "fit" in memory but not in a L1 cache, the memory may be the size of the cache line, and aligned with the cache line boundaries. Because of the size of a hash table, it may be disk-resident. Thus it may be effective to increase the number of cells per bucket to fill the expected unit of reading and writing to disk. Nominally, this may be a sector, but disks and controllers may make larger operations efficient.

Further, hash tables in example embodiments may grow. That is, more table space may be added, and a range of the hash functions may be expanded to map into both existing and new table space. Hash functions may be changed without fully rehashing the table all at once. That is, the sets of locations (e.g., buckets, slots, cells) may be expanded by adding new hash functions, and "old" locations may be marked for look-ups. In this way, over time, elements may migrate to new hash locations through, for example, methods 500 and 600.

The table space additionally may continue to be coalesced into more cells, but hash functions may be used that select a random starting element of the bucket or cell. This may help make operations faster. Having done this, it may be efficient to grow the size of cells, should that seem to be a good idea by, for example, merging adjacent pairs of cells. Such an approach may be used not only to make initial insertions of values faster, but to allow higher utilization as the table becomes full.

In alternative embodiments, as a hash table reaches its load factor, a "closing book" may be started. This may be a record of buckets from which it is known that there exists a path to an empty cell in a predetermined number of steps. This may enable a search to shorter search for an insertion operation. Thus it may be predetermined what values may be moved to the remaining empty locations, reducing the amount of searching required.

Hash tables according to example embodiment may be valid if viewed with more or fewer hash functions. Also, the tables may be valid whether values associated with keys or the keys themselves are present in one or more of the possible locations. Further, as items are moved, the table may remain in a consistent state. Such consistency may be ensured because moving an item from one location to another is atomic. The atomic actions may remain small by finding a plan for moving values, and then executing the plan in reverse: first, move the last value to a location, vacating the previous cell. If, in reversing the plan, it is discovered that the value to be moved or the cell intended to receive the value, no longer exists, then a new plan may be made.

Figure 8:
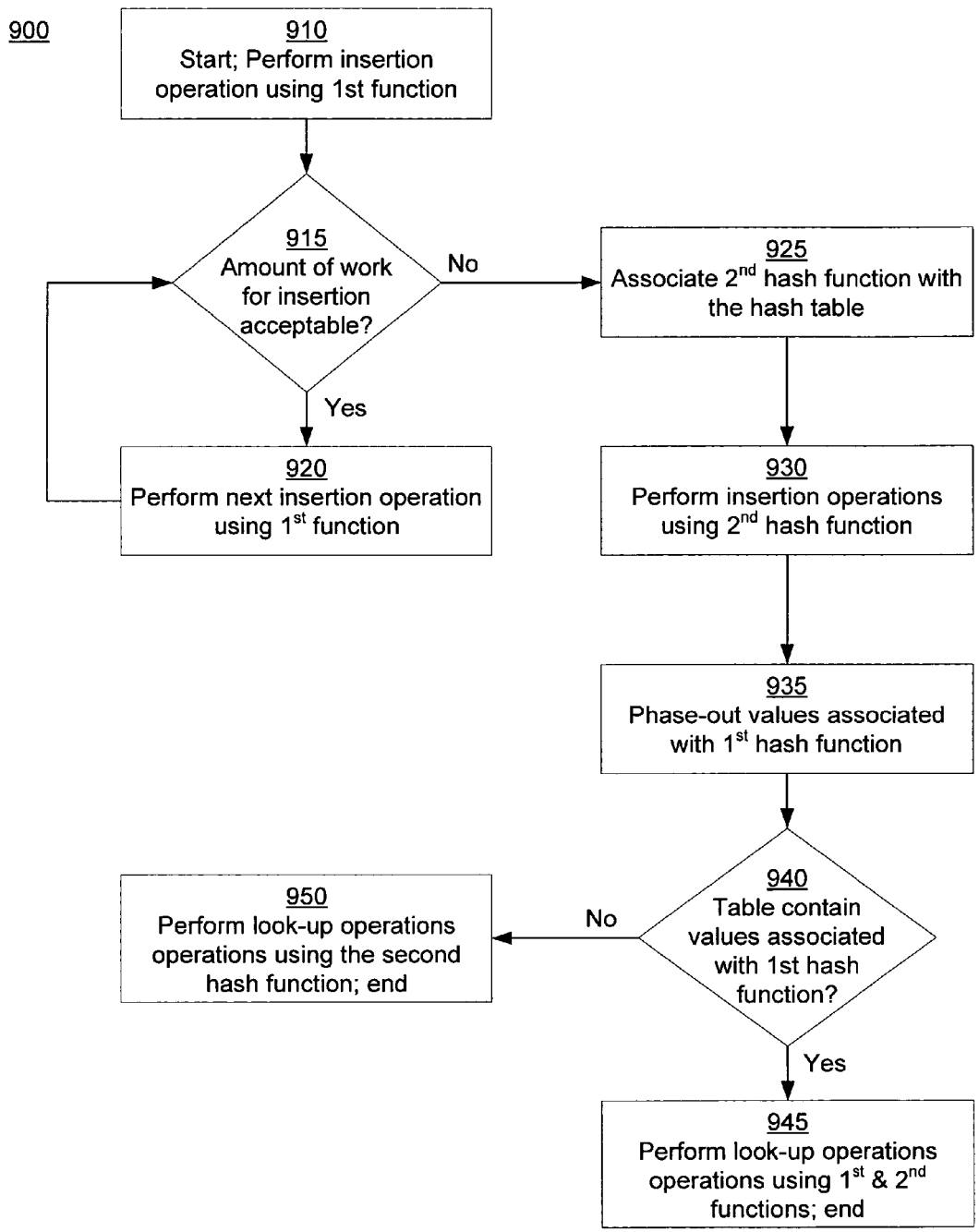
FIG. 8 is a flow diagram of an example method for increasing a load factor of a hash table.

FIG. 8 is a flow diagram of an example method 900 for increasing a load factor of a hash table. The method 900 may be implemented when the amount of work for insertion operations becomes higher that acceptable. Methods described herein may be directed to associating, for example, additional hash functions with an existing table or with coalescing buckets to increase the number of cells of a table.

The method 900 may start at step 910 when a first hash function is applied to a key to identify a location (e.g., a bucket) in a hash table. The hash table may be associated with only one hash function (i.e., the first hash function), for example. Of course, in alternative embodiments, the method 900 may be performed on any hash table regardless of the number of hash functions associated with the table. At step 915, a determination may be made as to whether the insertion operation created an unacceptable amount of work. Such may be the case if the insertion operation required moving many values to alternative locations within the table in order to place the current value in the table.

If the amount of work for the insertion was acceptable, then at step 920, a next insertion operation for another key may be performed. If, however, the amount of work was not acceptable, then a second hash function (or additional hash function if the hash table is already associated with a plurality of functions) may be associated with the hash table at step 925. The second hash function may be added concurrently with enlarging the table, though alternatively, the table size may remain static.

At step 930, an insertion operation may be initiated using the second hash function to identify a location in the hash table for a value to be inserted. Thus, the hash table may be associated with a second hash function different from the first hash function on the fly. This may increase the load factor of the table without constraining memory by, for example, increasing the size of the hash table.

At step 935, concurrent with using the second hash function to perform insertion operations, it may be desired to phase out use of the first hash function so that the table no longer contains values associated with the first hash function. A number of methods may be implemented to facilitate this phasing-out. For example, a count could be maintained of how may values in the table have been hashed by the first hash function. As each of these values is moved or deleted from the table, this total count may be decreased, thus helping to indicate when the table no longer contains values associated with the first hash function. Alternatively, the phase-out may be completed by iterating over the table in some order until a verification is completed. The verification may ensure that no value in the table is associated with the first hash function.

The method 900 may continue at step 940 with a determination as to whether there are values remaining in the table that are associated with the first hash function. If so, then any lookup operation may be performed using the first hash function if the value is associated with the first hash function at step 945. If the value is associated with the second hash function, then the lookup operation may be performed using the second hash function. If, on the other hand, the determination at step 940 reveals that no values in the table are associated with the first hash function, then at step 950, the lookup operation may be completed using only the second hash function.

The second hash function may be an independent hash function, that is, independent of the first hash function or any other hash function associated with the table. As described herein, associating a new, independent hash function may increase the load factor of the table. In an alternative embodiment, the second hash function may be a dependent hash function, that is, a hash function that is dependent on the first or some other hash function associated with the table. Adding such a dependent hash function may be associated with coalescing buckets to increase the number of cells per bucket. Alternatively, such a dependent hash function may be associated with increasing the number of cells per bucket by allocating more memory to the hash table. Such additional cells may be logically a part of buckets of a hash table but may be physically discontinuous with the buckets. For example, when the amount of work per insertion reaches an unacceptable level, more memory may be allocated to the hash table and the additional memory may include cells that are logically included within respective buckets of the hash table. Increasing the number of cells per bucket in this way also increases the load factor of the table.

In one embodiment, increasing the number of cells per bucket may be implemented by creating hash functions that are dependent on hash functions already associated with the hash table. For example, the first hash function may be applied to a key, resulting in a hashed key. This hashed key may identify a bucket. The second hash function may be dependent on the first hash function and may be applied to the hashed key to identify one of the newly added cells of the bucket. That is, the dependent hash function may ensure that the newly associated cells are searched to determine if the value may fit into them after the original cells of the bucket are searched. In this way, buckets may be coalesced or cells may be added to existing buckets through an increase in memory allocation on the fly, as the work per insertion reaches an unacceptable level.

Example Computing Environment

Figure 9:
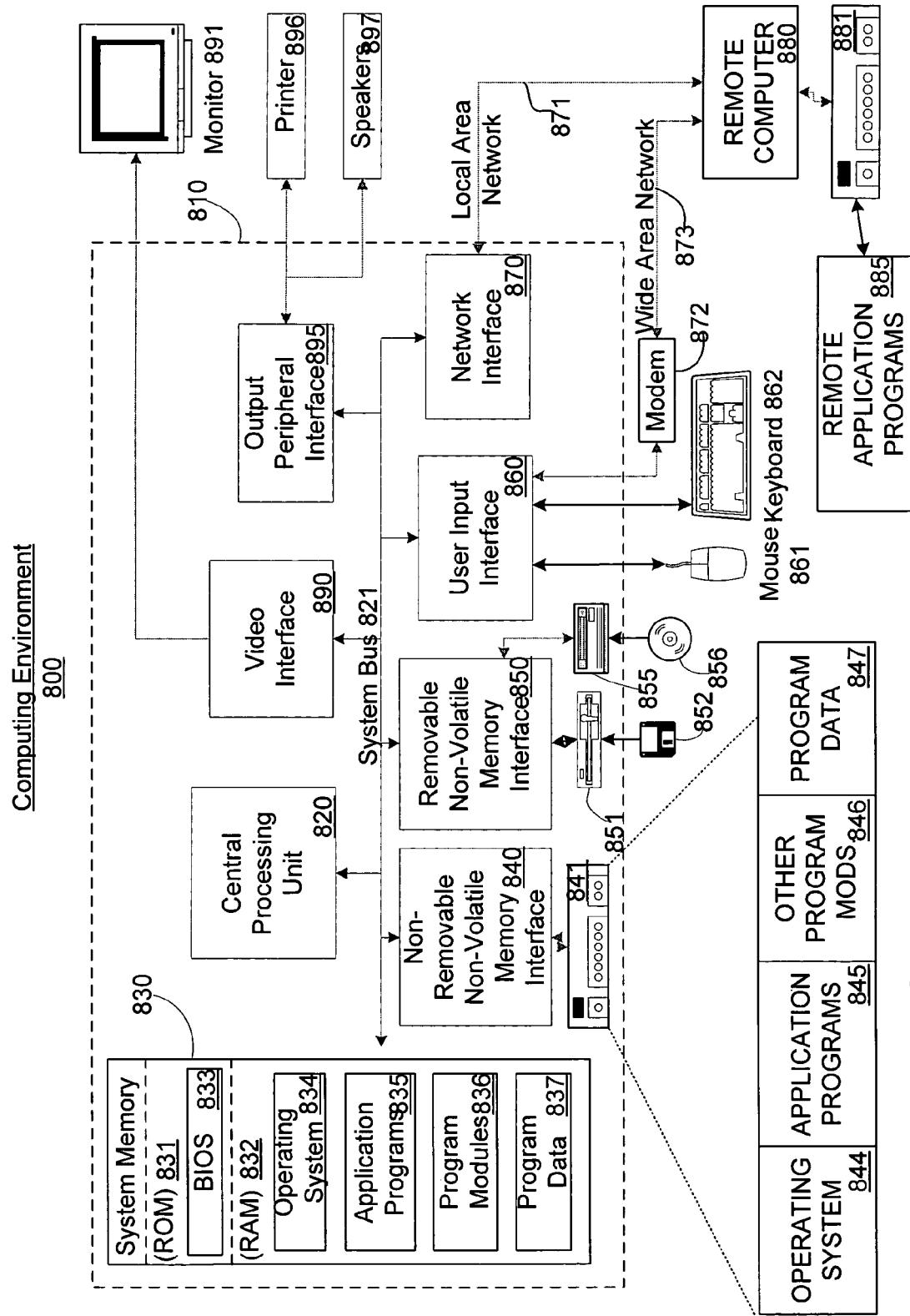
FIG. 9 is a block diagram showing an example computing environment in which aspects may be implemented.

FIG. 9 and the following discussion are intended to provide a brief general description of a suitable computing environment 800 in which an example embodiment may be implemented. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The term "data" refers to any information of any form, including commands, transfers, notifications, or requests. The terms "program code" and "code" refer to any set of instructions that are executed or otherwise processed by a processor. A processor may include a runtime or virtual machine such as the Java virtual machine, for example.

While a general purpose computer is described below, this is merely one example. The present invention also may be operable on a thin client having network server interoperability and interaction. Thus, an example embodiment may be implemented in an environment of networked hosted services in which very little or minimal client resources are implicated, e.g., a networked environment in which the client device serves merely as a browser or interface to the World Wide Web.

Although not required, embodiments can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. An embodiment may also be practiced in distributed computing environments where tasks are performed by remote processing devices that are linked through a communications network or other data transmission medium. In a distributed computing environment, program modules may be located in both local and remote computer storage media including memory storage devices.

FIG. 9 illustrates an example of a suitable computing system environment 800 in which an embodiment may be implemented, although as made clear above, the computing system environment 800 is only one example of a suitable computing environment and is not intended to suggest any limitation as to the scope of use or functionality alternative embodiments. Nor should the computing environment 800 be interpreted as having any dependency or requirement relating to any one or combination of components illustrated in the exemplary operating environment 800.

With reference to FIG. 9, an example system for implementing an embodiment includes a general purpose computing device in the form of a computer 810. Components of computer 810 may include, but are not limited to, a central processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

The system memory 830 includes computer storage media in the form of volatile and/or nonvolatile memory such as ROM 831 and RAM 832. A basic input/output system 833 (BIOS) containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837. RAM 832 may contain other data and/or program modules.

The computer 810 may also include other removable/non-removable, volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 9 provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB).

A monitor 891 or other type of display device is also connected to the system bus 821 via an interface, such as a video interface 890. In addition to monitor 891, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 9. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on memory device 881. It will be appreciated that the network connections shown are exemplary and other means of establishing a communications link between the computers may be used.

A computer 810 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

The methods of the present invention may be implemented in hardware, software or, where appropriate, a combination of both. Thus, the methods and apparatus of the present invention, or certain aspects or portions thereof, may take the form of program code (i.e., instructions) embodied in computer readable medium. A processor that executes program code for performing the steps of the methods of embodiments, as described in FIGS. 1-9 and as claimed, constitute a computing environment that embodies the present invention. In the case of program code execution on programmable computers, the computing environment will generally include a processor, a storage medium readable by the processor (including volatile and non-volatile memory and/or storage elements), at least one input device, and at least one output device. One or more programs are preferably implemented in a high level procedural or object oriented programming language to communicate with a computing environment. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed:

1. A computer-readable storage medium having program code stored thereon that, when executed by a computing environment, causes the computing environment to:

apply a first hash function to a key, resulting in identification of a first bucket of a plurality of buckets of a hash table, the first bucket having a fixed number of a plurality of cells, each cell for storing a value associated with a key;

determine that the first bucket does not have available space in any of the plurality of cells thereof to store a value associated with the key therein;

apply a second hash function to the key, resulting in identification of a second bucket of the plurality of buckets of the hash table, the second bucket having a fixed number of a plurality of cells, each cell for storing a value associated with a key;

determine that the second bucket does not have available space in any of the plurality of cells thereof to store the value associated with the key therein;

apply a third hash function to the key, resulting in identification of a third bucket of the plurality of buckets of the hash table, the third bucket having a fixed number of a plurality of cells, each cell for storing a value associated with a key;

determine that the third bucket does have available space in one of the plurality of cells thereof to store the value associated with the key therein, after moving a number of values to alternative locations within the hash table in order to create the available space in the third bucket;

store the value associated with the key in the available space in the one of the plurality of cells in the third bucket;

determine that an amount of work associated with storing the value in the third bucket is unacceptable based on the number of values moved to alternative locations exceeding a predetermined number; and associate a fourth hash function with the table upon determining that the amount of work associated with storing the value in the third bucket is unacceptable.

2. The computer readable storage medium of claim 1, having further program code stored thereon that, when executed by the computing environment, causes the computing environment to:

insert a value associated with the key into a first cell of the plurality of cells of the third bucket.

3. The computer readable storage medium of claim 2, wherein the value comprises the key.

4. The computer readable storage medium of claim 2, having further program code stored thereon that, when executed by the computing environment, causes the computing environment to:

apply the third hash function to the key, resulting in identification of the third bucket of the plurality of buckets; and read the value associated with the key inserted into the first cell of the plurality of cells of the third bucket.

5. The computer readable storage medium of claim 4, wherein the identification of the third bucket comprises identification of a portion of the first cell containing the value associated with the key.

6. The computer readable storage medium of claim 2, having further program code stored thereon that, when executed by the computing environment, causes the computing environment to:

move a value associated with a second key from the first cell of the third bucket to a second location in the hash table.

7. The computer readable storage medium of claim 6, wherein moving the value associated with the second key comprises:

copying the value associated with the second key, resulting in a copied value;

inserting the copied value in the second location; and deleting the value associated with the second key from the first cell of the first bucket.

8. The computer readable storage medium of claim 2, having further program code stored thereon that, when executed by the computing environment, causes the computing environment to:

coalesce the third bucket with a fourth bucket of the plurality of buckets when the amount of work associated with inserting the value into the first cell is undesirable.

9. The computer readable storage medium of claim 1, wherein when inserting each of a plurality of values into the hash table, the first hash function is applied first, the second hash function is applied second if an insertion bucket identified by application of the first hash function is occupied, and the third hash function is applied third if an insertion bucket identified by application of the second hash function is occupied.

10. A computer-readable storage medium having program code stored thereon that, when executed by a computing environment, causes the computing environment to:

associate a first hash function with a hash table;

apply the first hash function to a first key to identify a first bucket in the hash table, the first bucket having a fixed number of a plurality of cells, each cell for storing a value associated with a key;

insert a first value associated with the first key into one of the cells of the first bucket of the hash table, including moving a number of values to alternative locations within the hash table in order to create available space in the first bucket;

determine that an amount of work associated with storing the first value in the first bucket is unacceptable based on the number of values moved to alternative locations exceeding a predetermined number;

associate a second hash function with the hash table upon determining that the amount of work associated with storing the value in the first bucket is unacceptable;

apply the second hash function to the second key to identify a second bucket in the hash table, the second bucket having a fixed number of a plurality of cells, each cell for storing a value associated with a key; and insert a second value associated with the second key into one of the cells of the second bucket of the hash table, wherein the second hash function is associated with the hash table after the first value is inserted into the first bucket.

11. The computer readable storage medium of claim 10, having further program code stored thereon that, when executed by the computing environment, causes the computing environment to:

insert a second value associated with the second key into a second cell of a second bucket of the hash table, wherein the second cell is a part of memory allocated to the hash table after the first value is inserted into the first bucket.

12. The computer readable storage medium of claim 11, wherein the second hash function is dependent on the first hash function.

13. The computer readable storage medium of claim 12, wherein application of the first hash function to the second key identifies a first cell of the second bucket.

14. The computer readable storage medium of claim 11, wherein the second value comprises the second key.

15. The computer readable storage medium of claim 10, having further program code stored thereon that, when executed by the computing environment, causes the computing environment to:

coalesce a second bucket and a third bucket of the hash table, resulting in the second bucket comprising at least first and second cells.

16. The computer readable storage medium of claim 10, wherein application of the first hash function to the second key identifies a third bucket of the hash table.

17. A computer-readable storage medium, having program code stored thereon that, when executed by a computing environment, causes the computing environment to:
- insert a first value into a first cell of a first bucket of a hash table having a plurality of buckets, each bucket comprising a fixed number of a plurality of cells, each cell for storing a value;
- insert a second value into a second cell of the first bucket of the hash table;
- compare a first amount of work associated with moving the first value from the first bucket and a second amount of work associated with moving the second value from the first bucket;
- determine that the second amount of work is less than the first amount of work;
- move the second value from the second cell to a second bucket of the hash table; and
- insert a third value into the second cell of the first bucket, wherein the comparing the first amount of work and the second amount of work comprises comparing a location of the first cell in the bucket with a location of the second cell in the bucket.

18. The computer readable storage medium of claim 17, wherein the comparing the first amount of work and the second amount of work comprises comparing a first identifier associated with the first value to a second identifier associated with the second value.

* * * * *